UNITED STATES PATENT OFFICE.

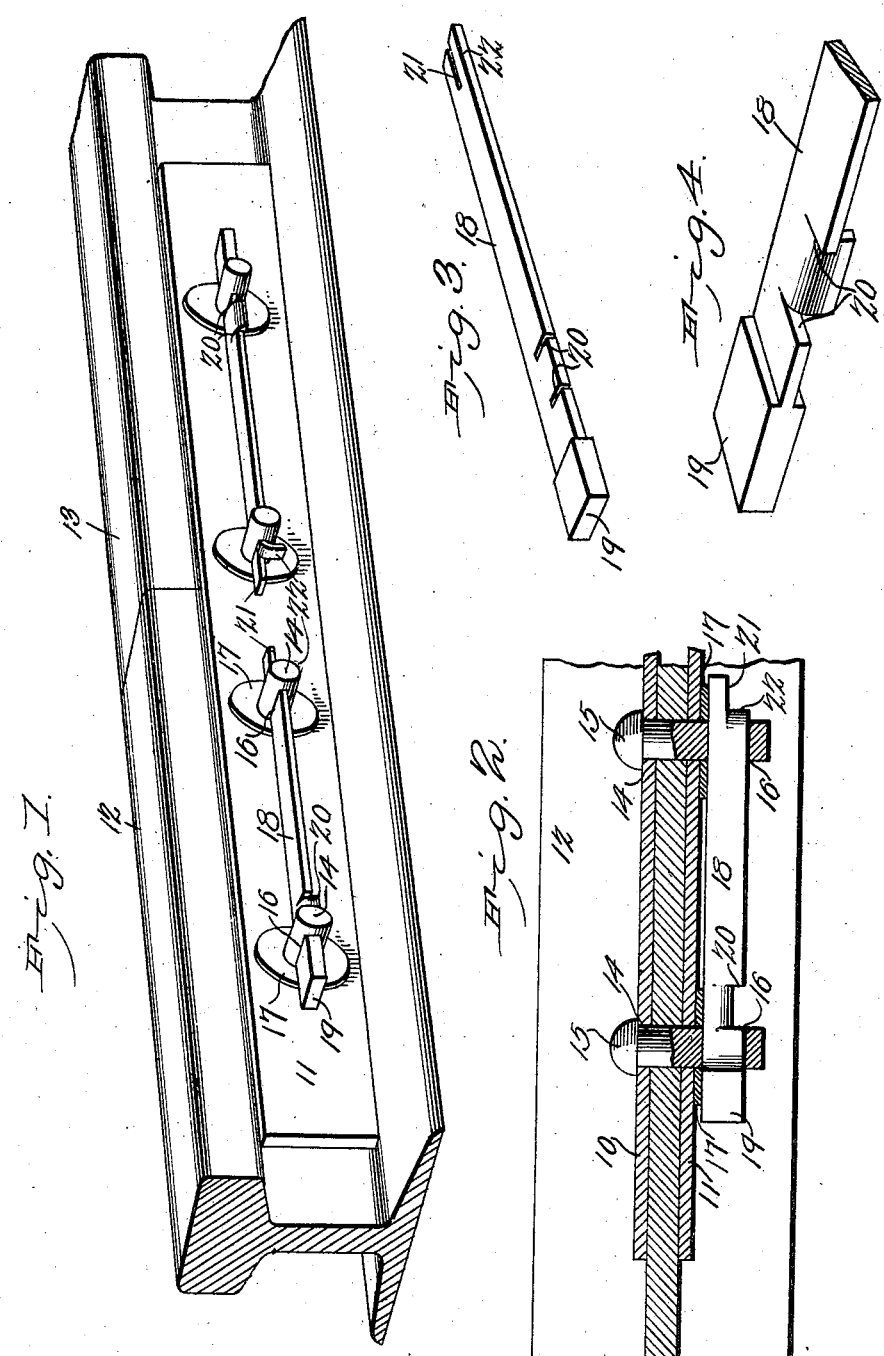

WILLIAM H. T. KING, OF DALLAS, TEXAS.

RAILWAY-RAIL JOINT.

No. 847,187.  Specification of Letters Patent.  Patented March 12, 1907.

Application filed November 6, 1906. Serial No. 342,254.

*To all whom it may concern:*

Be it known that I, WILLIAM H. T. KING, a citizen of the United States, residing at Dallas, in the county of Dallas and State of Texas, have invented a new and useful Railway-Rail Joint, of which the following is a specification.

This invention relates to fastening devices for locking bolts in position, more particularly to means for securing the clamping-bolts of railway-rail joints, but which may be employed in securing bolts in various structures, the object of the invention being to simplify the structure and manner of application, whereby the bolts are firmly held in place and all tendency to work loose obviated; and the invention consists in certain novel features of construction, as hereinafter shown and described, and specified in the claims.

In the drawings illustrating the invention corresponding parts are designated by the same reference characters.

The improved device may be employed for securing bolts in a variety of structures, and I do not therefore wish to be limited in the use of the device to any specific structure; but as the improvement is more particularly adapted to securing the clamp-bolts in railway-rail joints a structure of this character is employed in the drawings for illustration, Figure 1 representing a railway-rail joint in perspective with the improvement applied. Fig. 2 is a horizontal longitudinal section of a portion of the joint. Fig. 3 is a detailed perspective view of the locking-key before application. Fig. 4 is a perspective detail of the locking-key with the locking-tongue bent into operative position.

The railway-rail joint illustrated is of the usual construction, comprising the opposing clamp or "fish" plates 10 11, embracing the opposite sides of the adjacent ends of the rails 12 13, the rails and clamp-plates having the usual transverse registering apertures through which the clamp-bolts 14 pass, as shown. The clamp-bolts each have a head 15 upon one end and a transverse aperture 16 in the other end, the heads coming outside one of the clamp-plates and the aperture coming outside the other clamp-plate, as shown.

Washers 17 will preferably be placed around the apertured ends of the bolts 14 to receive the impact of the fastening means.

The fastening means consists of a key member 18, formed with an enlarged head 19 at one end to prevent it from passing entirely through the bolts and with one or more clefts 20, formed partially through the key transversely, the cleft being so spaced as to come in close proximity to the opposite side of the bolt from the head portion 19, so that when the portion of the key released by the cleft is bent at right angles to the key the portion thus bent off will extend in alinement with the horizontal plane of the key with its end presented to the side of the bolt. By this means the strains are borne by the bent "tongue" longitudinally thereof, and the strains are not inclined to bend the tongue back again to its first position, as in locking-keys as ordinarily constructed, with the bent portions disposed transversely to the horizontal plane of the key. This is a very important feature of the invention and adds materially to its value, efficiency, and safety, as no longitudinal strains to which the tongue portion is subjected will bend it back to its former position, as will be obvious.

The locking key member is long enough to reach through two of the bolts, as shown, and the end opposite to the head 19 is provided with a longitudinal cleft 21, as shown, one portion of the material at the side of the cleft adapted to be bent transversely of the key beyond the bolt to lock the key into engagement therewith, as indicated at 22 in Fig. 1, to still further secure the key in position. By this simple arrangement the bolts are firmly and securely locked in position and the parts firmly connected and all tendency to work loose obviated, as no strains to which they will be subjected will effect the tongue portions released by the clefts 20, as all the strains will be borne longitudinally of the tongues, as above noted. The strains thus expended endwise of the tongue portions will be efficiently resisted, as the tongues can be of a sufficient length to thus resist all strains without fracture.

The device is extremely simple, easily applied and operated, and is capable of such modifications and changes as will enable it to be adapted to all sizes of bolts and to bolts employed upon various structures where a cheap, simple, and easily-applied bolt-locking means is desired.

The wedge-keys are of metal sufficiently ductile to enable the tongue portions to be bent to the desired position without fracture, while at the same time sufficiently stiff and rigid to prevent accidental displacement or the reverse buckling of the tongues.

Having thus described my invention, what I claim is—

1. As a new article of manufacture, a locking-key having a cleft extending partially therethrough transversely, whereby the portion released by the cleft is adapted to be bent with its longitudinal axis in alinement with the longitudinal plane of the key, substantially as described.

2. As a new article of manufacture, a locking-key provided with an enlarged head and having a cleft spaced from said head and extending partially through the key transversely, whereby the portion released by the cleft is adapted to be bent with its longitudinal axis in alinement with the longitudinal plane of the key on the opposite side of the bolt from the said head portion, substantially as described.

3. As a new article of manufacture, a locking-key having spaced clefts extending partially therethrough transversely, whereby the portion between said clefts is adapted to be bent with its longitudinal axis in alinement with the longitudinal plane of the key, substantially as described.

4. As a new article of manufacture, a locking-key provided with an enlarged head and having spaced clefts extending partially through the key transversely, whereby the portion between the clefts is adapted to be bent with its longitudinal axis in alinement with the longitudinal plane of the key, substantially as described.

5. As a new article of manufacture, a locking-key provided with an enlarged head on one end and with a longitudinal cleft in the other end and having spaced clefts spaced from said ends and extending partially through the key transversely, whereby the portion between the clefts is adapted to be bent with its longitudinal axis in alinement with the longitudinal plane of the key, and the cleft end of the key likewise bent transversely of the plane of the key, substantially as described.

6. In a device of the character described, the holding-bolt having a transverse aperture, a locking-key extending through said aperture and having a cleft extending partially therethrough transversely at one side of said bolt with the material of the key released by the cleft adapted to be bent with its longitudinal axis in alinement with the longitudinal plane of the key whereby the bent portion is presented endwise to the bolt, substantially as described.

7. In a device of the character described, spaced holding-bolts each having a transverse aperture, a locking-key extending through both of said apertures and formed with an enlarged head on one end and with a longitudinal cleft in the other end adapted to be bent transversely of the bolt, said key having spaced clefts extending partially therethrough transversely, and the portion of the key released by the clefts adapted to be bent with its longitudinal axis in alinement with the longitudinal plane of the key, whereby the bent portion is presented endwise to the bolt, substantially as described.

8. In a railway-rail joint, the adjacent rails having spaced transverse apertures, clamp-plates upon the opposite sides of said rails and having apertures registering with the apertures in said rails, bolts engaging said apertures and having heads upon one end in engagement with one of said clamp-plates and with transverse apertures in their other ends in advance of the other of said clamp-plates, in combination with locking-keys extending through said apertures and each having a cleft extending partially therethrough transversely, whereby the portion released by said cleft is adapted to be bent with its longitudinal axis in alinement with the longitudinal plane of the key with the end of the bent portion presented to the bolt, substantially as described.

9. In a railway-rail joint, the adjacent rails having spaced transverse apertures, clamp-plates upon the opposite sides of said rails and having apertures registering with the apertures in said rails, bolts engaging said apertures and having heads upon one end in engagement with one of said clamp-plates and with transverse apertures in their other ends in advance of the other of said clamp-plates, in combination with locking-keys extending through said apertures and each formed with an enlarged head upon one end and having a cleft extending partially therethrough transversely, whereby the portion released by said cleft is adapted to be bent with its longitudinal axis in alinement with the longitudinal plane of the key with the end of the bent portion presented to the bolt on the opposite side from said key-head, substantially as described.

In testimony that I claim the foregoing as my own I have hereto affixed my signature in the presence of two witnesses.

WM. H. T. KING.

Witnesses:
G. B. FREEMAN,
W. B. WALDEN.